United States Patent [19]

Brown

[11] Patent Number: 4,534,376

[45] Date of Patent: Aug. 13, 1985

[54] ELECTRIC SIGNAL TO PRESSURE SIGNAL TRANSDUCER

[75] Inventor: Gregory C. Brown, Chaska, Minn.

[73] Assignee: Rosemount, Inc., Eden Prairie, Minn.

[21] Appl. No.: 528,727

[22] Filed: Sep. 1, 1983

[51] Int. Cl.[3] .............................................. G05D 16/00

[52] U.S. Cl. ........................................ 137/83; 137/84; 137/487.5

[58] Field of Search ........................ 137/83, 84, 487.5; 91/3

[56] References Cited

U.S. PATENT DOCUMENTS

| | | | |
|---|---|---|---|
| 2,397,448 | 3/1946 | Todd | 137/83 |
| 2,713,869 | 7/1955 | Weisenbach | 137/83 X |
| 2,914,076 | 11/1959 | Zimmerli | 137/82 |
| 3,095,906 | 7/1963 | Kolm, Jr. | 137/625.62 |
| 3,455,330 | 7/1969 | William et al. | 137/596 |
| 3,456,669 | 7/1969 | Lloyd | 137/84 |
| 3,538,936 | 11/1970 | Longyear | 137/83 |
| 3,542,051 | 11/1970 | McFadden et al. | 137/83 |
| 3,612,103 | 10/1971 | Waddington | 137/625.62 |
| 3,746,044 | 7/1973 | Velicer | 137/83 X |
| 3,993,101 | 11/1976 | Tippetts | 137/83 X |

FOREIGN PATENT DOCUMENTS

| | | | |
|---|---|---|---|
| 673159 | 10/1929 | France | 137/83 |

*Primary Examiner*—Alan Cohan
*Attorney, Agent, or Firm*—Kinney & Lange

[57] ABSTRACT

An electric signal to pneumatic signal transducer 10 comprises a nozzle 12 that accepts an input pneumatic supply and expels a gas stream 20. A receiver 16 that is spaced from the nozzle is positioned to recover at least a portion of the gas stream. The recovered portion constitutes a pneumatic output signal. The position of a deflector 14 relative to the gas stream is controlled by an electric input signal to aerodynamically deflect the gas stream expelled from the nozzle. The aerodynamic deflection affects the magnitude of the portion of the gas stream recovered by the receiver in a manner having a known relationship to the electric input signal, thereby generating a pneumatic output signal responsive to the electric input signal.

21 Claims, 14 Drawing Figures

ELECTRIC SIGNAL TO PRESSURE SIGNAL TRANSDUCER

BACKGROUND OF THE INVENTION

1. Field of the Invention

The present invention relates to an improved electric signal to pneumatic signal transducer apparatus.

2. Prior Art

Various electric signal to pneumatic signal transducers which convert an electric signal into a pneumatic signal for controlling valves and the like have been advanced. In recent years they have consisted principally of some variation of the single nozzle-flapper. In hydraulic applications, as opposed to pneumatic applications, both a fixed nozzle-fixed receiver with a plate variably interposed between them and a fixed nozzle-pair of fixed receivers with a slotted deflector have been utilized.

The single nozzle-flapper transducer is constructed with a nozzle connected to a pneumatic supply with a restriction imposed between the pneumatic supply and the nozzle. Typical of such devices are those detailed in U.S. Pat. Nos. 2,914,076 and 3,456,669. A flapper is located directly in front of the nozzle. The flapper is moved closer to or further from the nozzle responsive to an electrical input signal. The back pressure generated by the flapper between the nozzle and the restriction is the output pneumatic signal and varies as a function of the flapper's distance to the nozzle. This construction has inherent limitations, including the flapper being susceptible to erosion from grit in the gas stream and to contaminant buildup on the restriction and nozzle which eventually plugs the device. Additionally, expensive and sophisticated methods of damping the flapper to prevent it from oscillating in the gas flow due to externally applied vibration and ultimately striking the mouth of the nozzle are required.

The hydraulic transducer construction incorporates a plate inserted between a fixed nozzle and a fixed receiver to block the flow to the receiver responsive to an electric input signal. Typical of these devices are those detailed in U.S. Pat. Nos. 3,095,906 and 3,455,330. A disadvantage of this mechanization when compared to the instant invention is that it requires a plate of high mass which results in a high inertia loading for the actuator. Additionally, the plate must have a large range of motion to effect the desired results and must interact with substantially the entire hydraulic flow. This results in a transducer that has low gain while requiring high energy consumption to drive the plate.

While physically, this device appears to be close prior art that is known, since it does employ a fixed nozzle and receiver, conceptually, it is remote from the instant invention since the principle of operation is completely different. In the prior art, the hydraulic transducer varies the flow to the receiver by physically blocking the hydraulic fluid with a plate interposed between the nozzle and receiver. The instant invention relies on the aerodynamic interaction between the deflector and the gas stream to vary the flow to the receiver. Such use of aerodynamic interaction is not known in the prior art and overcomes many of the disadvantages of the hydraulic transducer.

The second hydraulic device has a fixed nozzle and a pair of fixed receivers. A slotted deflector is moved laterally with respect to the liquid stream to direct the liquid stream primarily to either of the receivers as desired. Such devices are detailed in U.S. Pat. Nos. 3,542,051 and 3,612,103. This type of device has the same disadvantages as the previously mentioned hydraulic transducer. Conceptually these devices too are remote from the instant invention. The slotted deflector interacts with the entire fluid stream. In effect, by moving the slot of the deflector, the shape of the nozzle opening is changed to redirect the direction of flow. Such means of changing flow direction are unrelated to the aerodynamic interaction of the instant invention.

SUMMARY OF THE INVENTION

The invention is an improved electric signal to pneumatic signal transducer. As used herein, the term pneumatic refers to air and other gases and the term gain means the slope of the pressure of the pneumatic output signal as a function of deflector displacement. The present invention comprises a nozzle that accepts a pneumatic input supply and expels a gas stream. A receiver that is spaced from the nozzle is positioned to recover at least a portion of the gas stream. The recovered portion of the gas stream constitutes a pneumatic output signal. The position of a deflector relative to the gas stream is controlled by an electric input signal to aerodynamically deflect the gas stream expelled from the nozzle. The deflection affects the magnitude of the portion of the gas stream recovered by the receiver in a manner having a known relationship to the electric input signal, thereby generating a pneumatic output signal responsive to the electric input signal.

In one embodiment, the deflector has a magnetic force actuator. The magnetic force of the actuator is a function of the electric input signal. As the electric input signal changes, the position of the deflector relative to the position of the gas stream is changed.

The instant invention has the desirable characteristic of low energy consumption with high energy gain. It is desirable to use this invention with an industry standard 4 to 20 milliamperes (mA) two-wire electric input signal and other standard electric signals. The aerodynamic interaction between the deflector and the flow stream results in the deflector requiring very little energy to actuate it and gives the deflector the very high gain instrumental in achieving such use. Also contributing to the low energy requirements is the fact that the deflector has a low mass. When utilized with a magnetic actuator as shown, a device made according to the instant invention is fully operational with an actuator coil current of 2 mA. This has the advantage of being able to move the deflector its full range with a 4 mA input signal and no portion of the 4–20 mA signal above 4 mA is required to drive the deflector.

The device of the present invention additionally exhibits excellent contaminant tolerance. Such contaminants comprise undesired, varnish-like material in the pneumatic supply that tend to build up on the structure that it impacts. The transducer has relatively large nozzle and receiver sizes which resist plugging by contaminants in the pneumatic supply and thereby achieve excellent tolerance of contaminants. The present device also experiences excellent resistance to erosion by grit in the gas stream. Grit as used herein comprises undesired abrasive material composed of granules in the pneumatic supply. This resistance to erosion is a function of the fact that the deflector element interacts with only a small portion of the gas stream and, accordingly, is not exposed to the majority of the grit contained in the gas stream.

Further, devices made according to the invention have high vibration resistance. The only moving parts are the deflector and actuator pedestal which have very low mass, resulting in a very high resonant frequency. This reduced mass makes the device resistant to normally encountered environmental vibrations, which have frequencies much lower than the resonant frequency of a device made according to the present invention.

DESCRIPTION OF THE PREFERRED EMBODIMENTS

Figure 1:
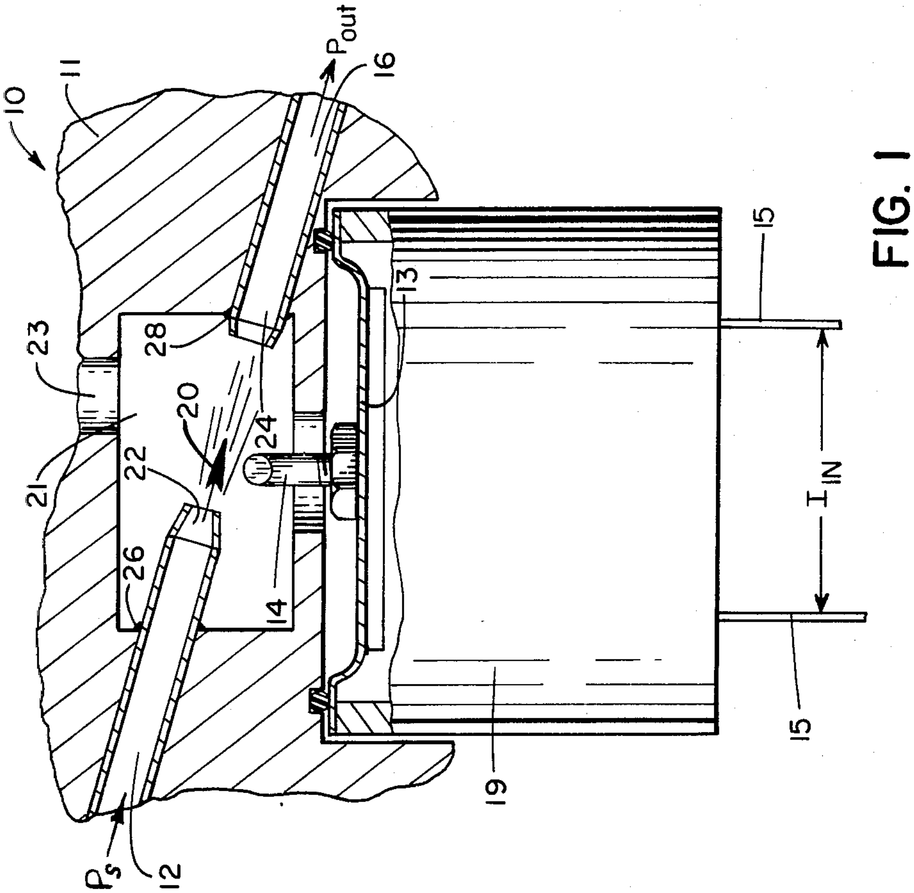
FIG. 1 is a sectional view of an electric signal to pneumatic signal transducer illustrating a gas stream emitting nozzle and a receiver, wherein the gas stream is substantially unaffected by a deflector made in accordance with the present invention.

FIG. 1 shows electric signal to pneumatic signal transducer 10, comprising nozzle 12, deflector 14 and receiver 16 and enclosed in cap 11. Cap 11 is removably mounted on actuator module 19 and has an internal chamber 21. Nozzle 12 is supported on cap 11 and protrudes into chamber 21. Nozzle 12 is preferably comprised of a conduit tapered at its end in chamber 21 to form nozzle opening 22. Nozzle 12 has a longitudinal axis through its geometric center and normal to the plane of nozzle opening 22. Preferably nozzle 12 is affixed to cap 11 as by brazing or welding shown at 26.

Receiver 16 passes through cap 11 and is affixed to cap 11 as by brazing or welding, shown at 28. Receiver 16 protrudes into chamber 21. Receiver 16 is preferably comprised of a conduit tapered at the end that protrudes into chamber 21 to form receiver opening 24. Receiver 16 has a longitudinal axis through its geometric center, preferably aligned with the longitudinal axis of nozzle 12 and normal to the plane of receiver opening 24.

Electric leads 15 are connected to actuator module 19. A portion of actuator module 19 preferably comprises the means for actuating deflector 14, such as the magnetic flux generating coil of FIG. 6. In the embodiment shown, the top portion of actuator module 19 comprises actuator 13 which preferably comprises a diaphragm whose vertical deflection motion is responsive to electric input signals applied to leads 15. Actuator 13 therefore controls movement of deflector 14 in response to the electric input signal ($I_{in}$) provided to leads 15. Deflector 14 comprises a rod having a round cross-section and having a longitudinal axis perpendicular to the longitudinal axes of nozzle 12 and receiver 16. The support for deflector 14 on actuator 13 is laterally offset from nozzle 12 and receiver 16 generally as shown in FIG. 6A. Nozzle 12 is connected to a gas supply having a supply pressure shown by $P_S$. Nozzle 12 expels a gas stream represented by lines 20. Receiver 16 is spaced from nozzle 12 and is so positioned with respect to nozzle 12 as to be able to recover at least a portion of gas stream 20 expelled by nozzle 12. Preferably, the longitudinal axes of nozzle 12 and receiver 16 are aligned. Receiver 16 converts the kinetic energy of the velocity of the recovered portion of gas stream 20 to the potential energy of a pneumatic pressure. Exhaust port 23 in chamber 21 exhausts the remainder of gas stream 20 not recovered by receiver 16 to the atmosphere.

The recovered portion of gas stream 20 has a pressure shown by $P_{out}$. In the condition shown, $P_{out}$ is at its maximum value with respect to $P_S$. This is due to the fact that, as represented in FIG. 1, deflector 14 is positioned in its maximum downward position by actuator 13 such that it is not substantially affecting gas stream 20. The condition shown is representative of the maximum electric input signal acting on actuator 13. In the preferred embodiment shown, the maximum electric input signal therefore results in the maximum pressure output signal from receiver 16. Typically, in this condition, $P_{out}$ is 30% to 60% of $P_S$, but may approach 100% of $P_S$ depending on parameters such as the distance between nozzle 12 and receiver 16 and the sizes of nozzle opening 22 and receiver opening 24.

Figure 2:
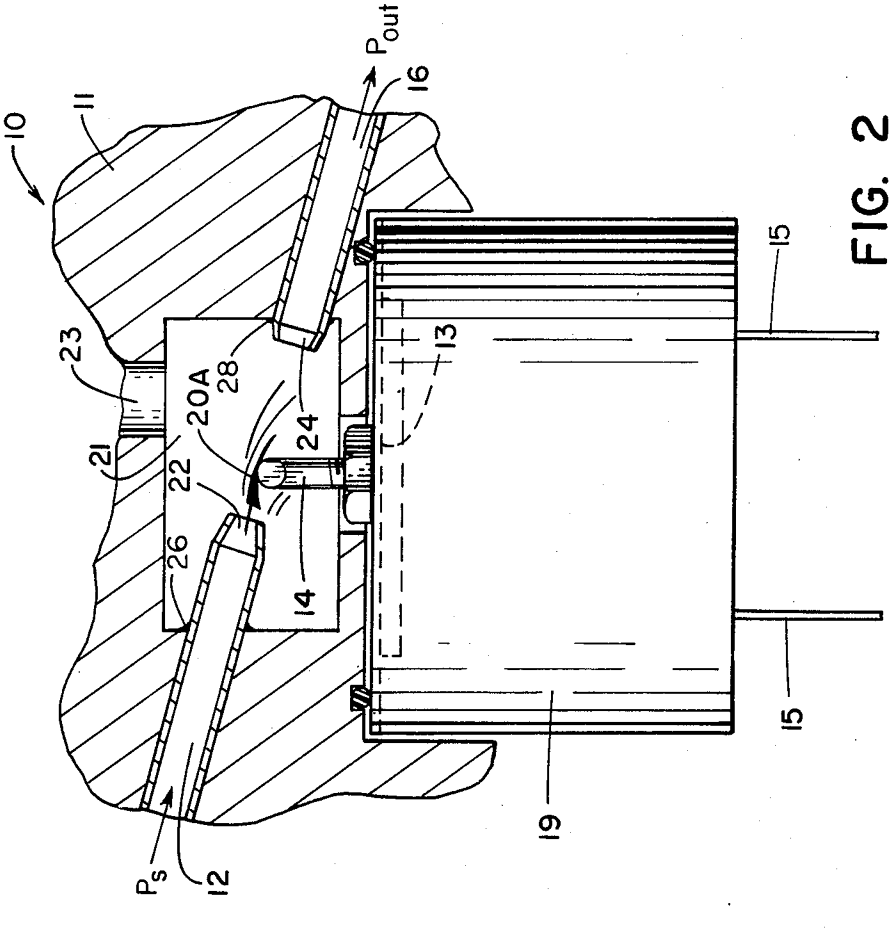
FIG. 2 is a sectional view substantially the same as FIG. 1 except the gas stream is substantially fully deflected by the deflector.

FIG. 2 shows electric signal to pneumatic signal transducer 10, comprising nozzle 12, deflector 14 and receiver 16 disposed in cap 11. All numbers in FIG. 2 correspond to the similarly numbered components in FIG. 1. Actuator 13 controls deflector 14 in response to an electric input signal provided to leads 15. In FIG. 2, the minimum electric input signal, which may be zero current, is affecting actuator 13 and deflector 14. This causes deflector 14 to be drawn upward aerodynamically by the lift generated and mechanically by the spring action of actuator 13. Deflector 14 rises to its maximum upward position, resulting in the maximum deflection of gas stream 20A. Gas stream 20A is shown deflected such that the minimum portion of gas stream 20A is recovered by receiver opening 24. In this situation, $P_{out}$ is typically 1% to 5% of $P_s$, but may be equal to zero. In the position shown in FIG. 2, almost all of gas stream 20A is exhausted through exhaust port 23. Accordingly, in this embodiment of the invention, the minimum electric input signal is related to substantially zero pressure out from receiver 16.

It should be understood that in other configurations of deflector 14 the deflector shape may cause the aerodynamic force to tend to push the deflector out of the gas stream. In such configuration, an increasing electric input signal is required to increase gas stream 20 deflection. This occurs for example where deflector 14 has the shape of an inverted airfoil. As is known, an airfoil is a body of such shape that the force exerted on it by relative motion of a fluid has a larger component normal to the direction of motion than along the direction of motion. An example is the wing of an airplane. As usually used with an airplane wing, the component of force normal to the direction of motion developed by the airfoil is upward for a given positive angle of attack. However, inverting such airfoil at the same angle of attack results in a downward force. As used with the instant invention, the force generated by such inverted airfoil will tend to drive deflector 14 away from gas stream 20.

A relationship that is important to the performance of the invention is the distance between nozzle opening 22 and receiver opening 24. Accordingly in the preferred embodiment shown, satisfactory performance is obtained where the distance between nozzle opening 22 and receiver opening 24 is eight to twelve times the diameter of nozzle opening 22. Further it has been found that in order to enhance the amount of recovery of gas stream 20 by receiver 16, it is desirable that receiver opening 24 be larger than nozzle opening 22. Satisfactory performance has been demonstrated with the diameter of receiver opening 24 being between one and two times the diameter of nozzle opening 22, with optimum results occurring where the diameter of receiver opening 24 is 1.5 times the diameter of nozzle opening 22. In a preferred embodiment, it has been found that nozzle 12 performs satisfactorily and exhibits resistance to plugging by contaminants in gas stream 20 where the diameter of nozzle opening 22 is between 0.025 centimeters and 0.05 centimeters, with optimum results occurring at 0.0375 centimeters. As indicated above, the aerodynamic interaction between deflector 14 and gas stream 20 produces lift on deflector 14. Such lift is generated by known aerodynamic principles wherein the accelerated flow over deflector 14 results in a reduced pressure with respect to the reference pressure beneath deflector 14. The reference pressure acts on deflector 14 in an upward direction resulting in lift. This lift acts to draw deflector 14 further into gas stream 20, ultimately resulting in the deflection shown at 20A. Actuator 13 is preferably a stretched metal diaphragm that tends to return to its rest position shown in FIG. 2 and functions as a bias spring tending to drive deflector 14 to its furthest position into gas stream 20. Accordingly, the electric input signal is required to drive deflector 14 downward or away from gas stream 20 to overcome the aerodynamic forces and the diaphragm bias force.

FIGS. 1 and 2 together show the operational limits of the present device representing the full range of motion of the deflector. The range of motion of the deflector with respect to the gas stream is exaggerated in FIGS. 1 and 2 for illustrative purposes. In actuality, the required range of motion is very small and the deflector need interact with only a very small portion of the gas stream to achieve the desired results.

Considering now both the conditions represented in FIGS. 1 and 2, it can be seen that the invention provides an electric signal to pneumatic signal transducer wherein the maximum electric input signal results in the maximum pneumatic output signal and the minimum electric input signal results in substantially zero pneumatic output signal. Varying the electric input signal between the two operational limits produces a continuously variable pneumatic output signal that bears a known relationship to the electric input signal.

In a preferred embodiment, deflector 14 has been shown to provide optimum results when it has a diameter of 0.8 millimeters. This very small size results in deflector 14 being of very low mass. Very low mass is beneficial in contributing to resistance to environmental vibration since such low mass contributes to deflector 14 having a very high resonant frequency. Typically, environmental vibrations that could affect the device are of lower frequency and accordingly have diminished adverse effects on deflector 14.

Deflector 14 is required to move less than 0.010 millimeters to achieve the limits of operation shown in FIGS. 1 and 2. Additionally, deflector 14 interacts directly with only a small portion of gas stream 20A. It need not be fully immersed in gas stream 20A to obtain the desired output. This is beneficial from the standpoint of erosion resistance. Typically, erosion of transducer components is caused by grit in the gas stream impacting such components. Since deflector 14 interacts directly with such a small portion of gas stream 20A, the majority of the grit in gas stream 20A bypasses deflector 14.

Figure 7:
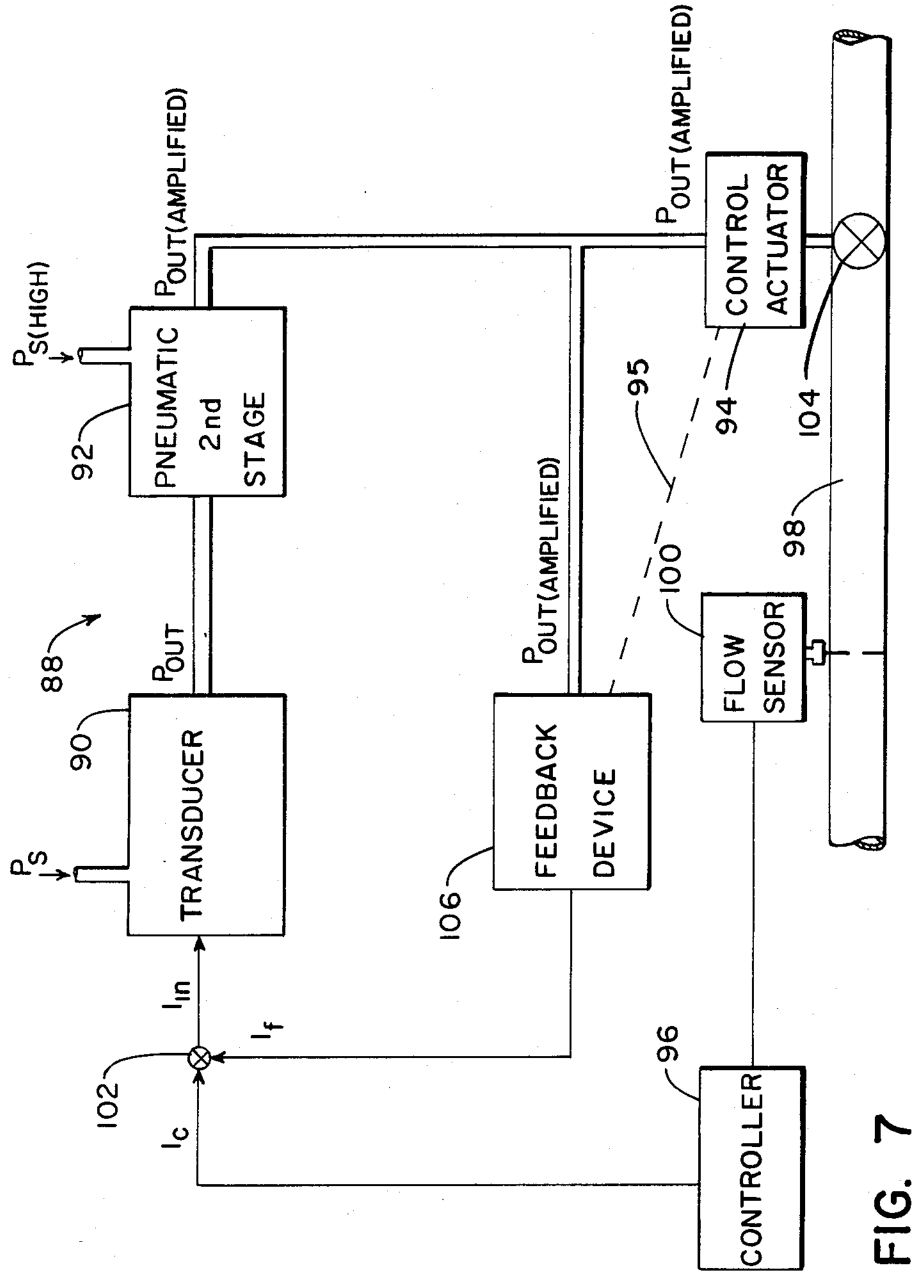
FIG. 7 is a block diagram of the electric signal to pneumatic signal transducer integrated in a control loop.

The aerodynamic lift affecting deflector 14 plus the small mass of deflector 14 and the fact that deflector 14 need only move a small distance and interact directly with only a small portion of gas stream 20A all combine to require only a small amount of electrical power to drive deflector 14. A device made according to the present invention requires only 2 mA at 5 volts to power such device. This power requirement is a function of the aforementioned factors and is substantially independent of the means of actuation of deflector 14. Standard instrumentation systems operate with 4 to 20 mA. It is desirable that the current from zero to 4 mA is used to power the system while the 4 to 20 mA comprises the electric input signal. Transducer 10 is typically integrated into a feedback loop as shown in FIG. 7 comprising transducer 90, pneumatic second stage or amplifier 92 and feedback device 106. Transducer 10 (or 90) consumes 2 mA of quiescent power representing zero input signal. Where such feedback loop is utilized in a 4–20 mA system, this leaves 2 mA for use by any electronics that may be associated with pneumatic second stage 92 and feedback device 106. Since transducer 10 does not require any additional current to physically power it to represent any signal greater than zero, the full operational limits can be obtained by changing the current as little as an additional 0.1 mA. This low power consumption gives the versatility which permits a device made according to the present invention to be used with a wide range of standard input signals.

Figure 3:
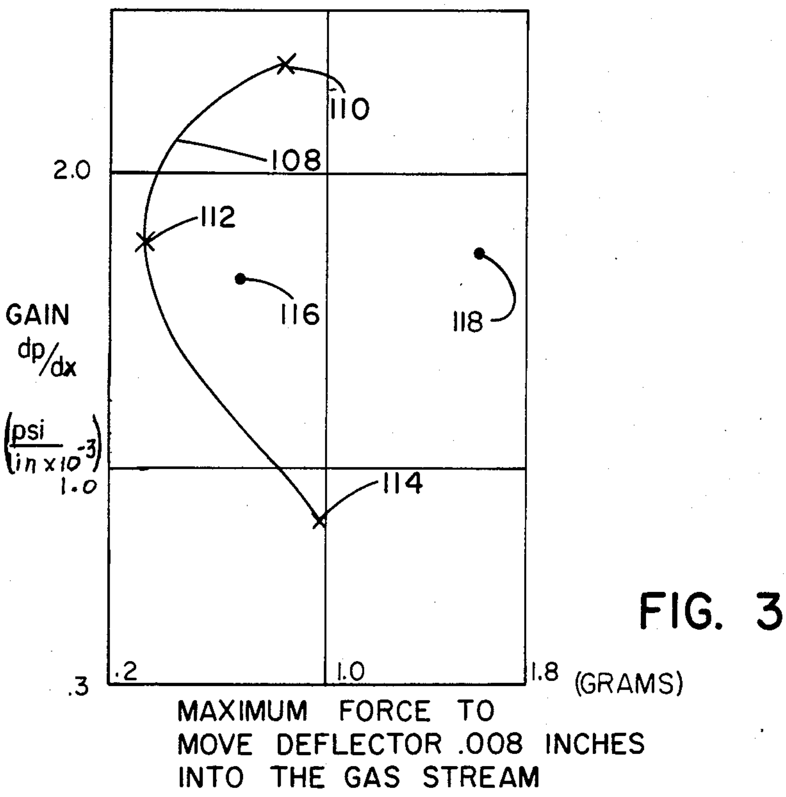
FIG. 3 is a graph illustrating deflector gain versus force required to incrementally move various deflector embodiments of the present invention.

It is desired that, for satisfactory operation, the deflector produce the aerodynamic effects on the gas stream as described herein. A number of deflector shapes have proved satisfactory. FIG. 3 shows a graph of various deflector embodiments that have been built and tested under comparative conditions. The vertical axis of the graph is gain, increasing in an upward direction. The horizontal axis is the maximum force required to move the deflector 0.008 inch, from just outside the gas stream into the gas stream, the force increasing to the right on FIG. 3. As previously defined, gain is the slope of the pressure of the pneumatic output signal, $P_{out}$ as a function of deflector displacement. It is desirable to have high gain while at the same time having a small force required to move the deflector. Accordingly, all things being equal, the more desirable deflector embodiments tend to plot out toward the upper left hand corner of the graph. Curve 108 on the graph is a plot of cylindrical deflectors with each point representing a deflector of different diameter. The deflector having the smallest diameter is represented at point 110. The largest diameter deflector is represented at point 114. Such deflectors are substantially as shown in FIG. 6A. Point 110 on curve 108 is a cylinder with diameter equal to 1.5 times the diameter of the nozzle opening. Point 112 represents a cylinder with a diameter equal to twice the diameter of the nozzle opening and point 114 represents a cylinder with a diameter equal to 2.5 times the diameter of the nozzle opening. All such embodiments proved satisfactory, with the preferred embodiment of the deflector being a cylindrical rod with diameter equal to 1.5 to 2.0 times the diameter of the nozzle opening.

Figure 3A:
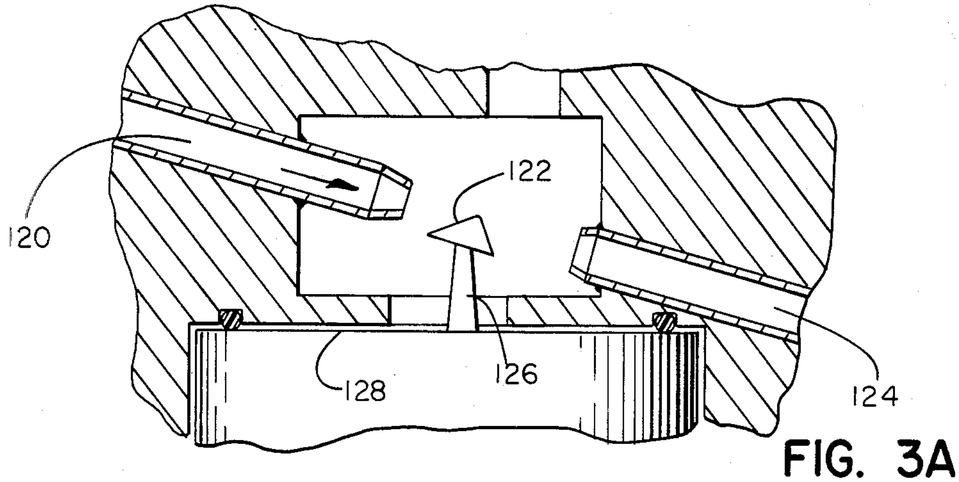
FIG. 3A is a sectional view of an electric signal to pneumatic signal transducer wherein the deflector is triangular in cross-section.

Additional preferred embodiments include a rod or tube of triangular crossection, the test results of which are shown at point 118. As shown in FIG. 3A a side of deflector 122 is held substantially parallel with the centerline of nozzle 120 and the gas stream is affected primarily by the other two sides of deflector 122. Receiver 124 is shown positioned as described in FIGS. 1 and 2. Deflector 122 is mounted on pedestal 126 which has a truncated cone shape. Pedestal 126 is affixed to actuator 128, preferably by bonding or brazing.

Figure 3B:
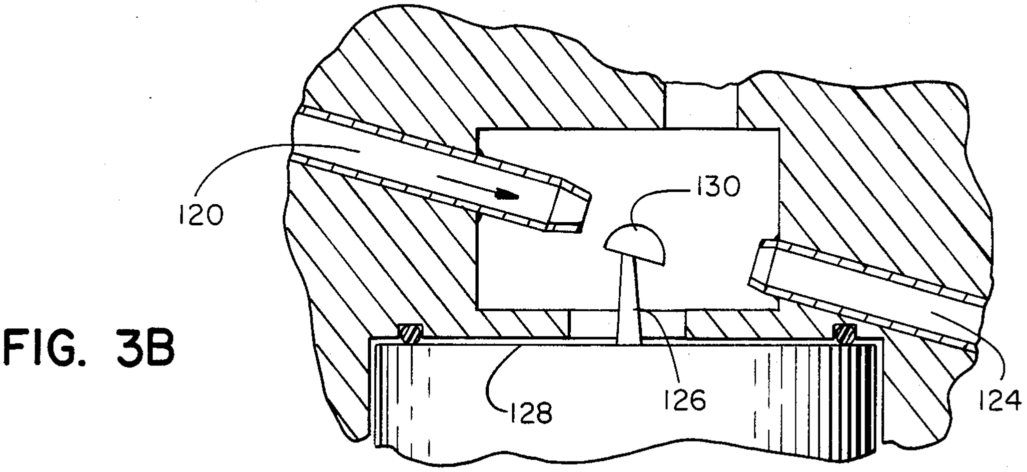
FIG. 3B is a sectional view of an electric signal to pneumatic signal transducer wherein the deflector is half round in cross-section and the planar side is held substantially parallel to the longitudinal axis of the nozzle.
Figure 3C:
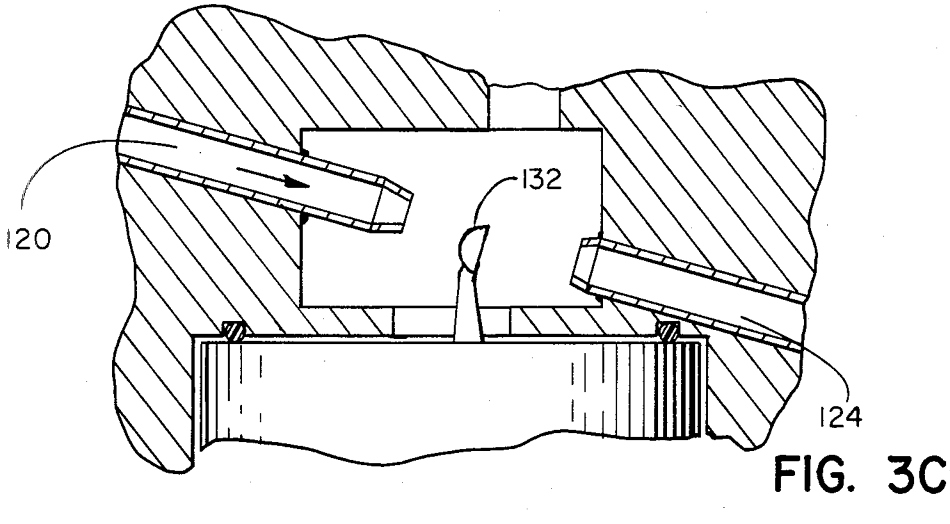
FIG. 3C is a sectional view of an electric signal to pneumatic signal transducer wherein the deflector is half round in cross-section and the planar side is held substantially normal to the longitudinal axis of the nozzle.

In another embodiment, the deflector may also comprise a rod or tube having a half round cross-section. In this case satisfactory results are obtained both where the diameter or planar side of the half round of deflector 130 is held substantially parallel to the centerline of nozzle 120 as shown in FIG. 3B or, as shown in FIG. 3C, the diameter of deflector 132 is held normal to nozzle 120 centerline. Other components in FIGS. 3B and 3C correspond to similarly numbered components in FIG. 3A. In both such cases, the flat or planar side of the half round deflector is farthest from the nozzle and the portion of the deflector at the radius which is normal to such side is closer to the nozzle to affect the gas stream. In all of such preferred embodiments, movement of the deflector rod or tube is normal to the longitudinal dimension of the deflector such that a side surface of the deflector rod or tube rather than the end of the deflector affects the gas flow. Test results of the embodiment of FIG. 3C are shown at point 116 of FIG. 3.

Figure 3D:
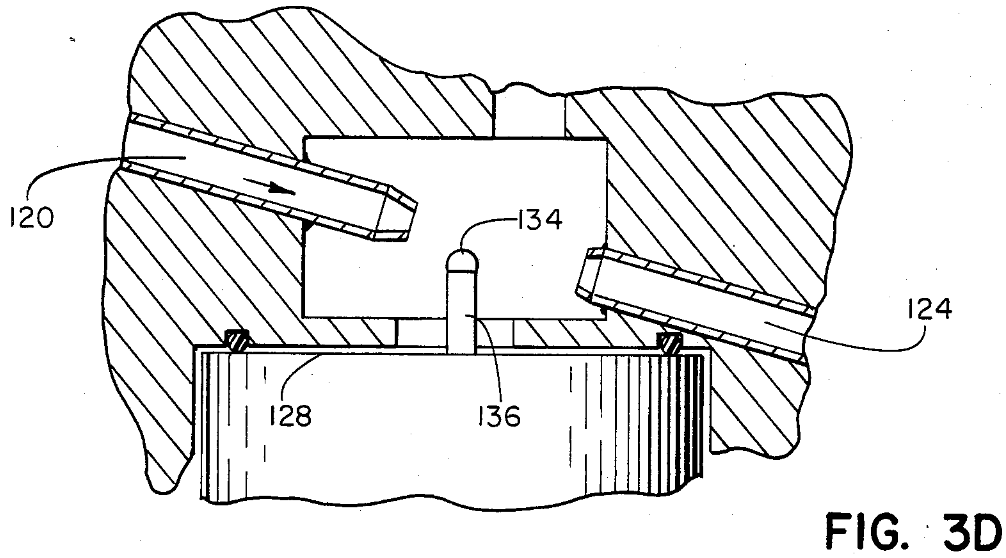
FIG. 3D is a sectional view of an electric signal to pneumatic signal transducer wherein the deflector is a rod circular in cross-section having one end affixed to the actuator and the second end comprising the deflector and being hemispherical in shape.
Figure 3E:
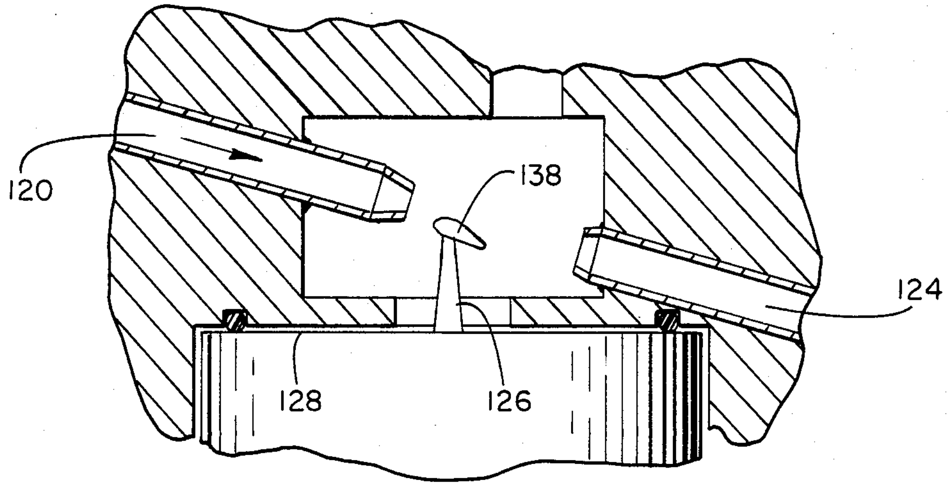
FIG. 3E is a sectional view of an electric signal to pneumatic signal transducer wherein the deflector is airfoil shaped in cross-section.

FIG. 3D shows a further embodiment of the invention, such embodiment comprises a rod with an end that is hemispherical in shape. In this embodiment, the deflector rod end is moved to affect the gas stream by motion in the direction of its longitudinal axis. Unlike the other embodiments shown, the point of mounting pedestal 136 to actuator 128 is not laterally offset from a vertical projection of the longitudinal axis of nozzle 120. It is important to understand that additional deflector configurations that produce the desired aerodynamic effects on the gas stream may be utilized. One such configuration is that of an airfoil-shaped deflector 138 shown in FIG. 3E.

Figure 4:
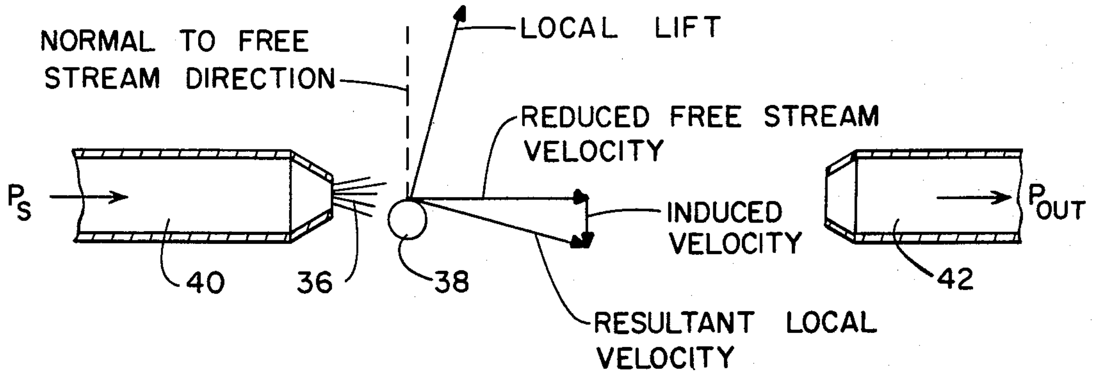
FIG. 4 is a vector diagram illustrating aerodynamic effects on the gas stream resulting from positioning the deflector to affect the gas stream.

The aerodynamic effects of a deflector, shown at 38, on a gas stream 36 are shown in FIG. 4. In the situation shown in FIG. 4, deflector 38 is located with respect to nozzle 40 somewhere between the operational limits of operation shown in FIGS. 1 and 2 such that gas stream 36 is affected by deflector 38 but is not fully deflected as shown in FIG. 2. Nozzle 40 has a centerline as shown in FIG. 6B. Gas stream 36 flowing from nozzle 40 across deflector 38 results in generation of local lift affecting deflector 38 as shown by the local lift vector. Within the desired range of motion of deflector 38, the force of the lift generated increases with increasing proximity of deflector 38 to the centerline of nozzle 40. To maintain a given position of deflector 38 with respect to gas stream 36, the actuator controlling the movement of the deflector must develop a force equal and opposite to the force of the lift generated on deflector 38 plus the force of the spring bias of the actuator as shown at 13 in FIGS. 1 and 2. Accordingly, a greater magnitude electric input signal is required to generate such opposing force the more proximate deflector 38 is to the centerline of nozzle 40. The effect of the force of lift, then, is to draw deflector 38 further into gas stream 36. The result is that decreasing the electric input signal allows deflector 38 to be drawn further into gas stream 36 by the force of the lift and the bias of the actuator.

FIG. 4 shows a vector analysis of the interaction of deflector 38 and gas stream 36. Such analysis is a conventional aerodynamic analysis of the effect of the production of lift. In such analysis, the resultant local velocity and the local lift vector are always at right angles to each other. As more lift is generated, the magnitude of the lift vector increases and its angle relative to the reduced free stream velocity is reduced. In effect, the lift vector tips toward the horizontal. The resultant local velocity stays at a right angle to the lift vector.

The resultant local velocity affects both the reduced velocity free stream velocity and the induced velocity. The magnitude of the resultant local velocity vector remains constant and is equal to the magnitude of the velocity of gas stream 36. The reduced free stream velocity is always in the direction of gas stream 36. In this particular case, it is always horizontal. The induced velocity is always at a right angle with the reduced free stream velocity and always completes the triangle with the resultant local velocity. From the above description of the relationship of the various vectors, it can be seen that as lift increases and the local lift vector and resultant local velocity rotate in a clockwise direction, the induced velocity vector increases in magnitude and the reduced free stream velocity vector decreases in magnitude. The increase or decrease in the lift vector magnitude and change in direction is a function of the position of deflector 38 relative to gas stream 36, which in turn is a function of the electric input signal. Since the magnitude of the reduced free stream velocity is directly related to the lift vector, the reduced free stream velocity is also a function of the electric input signal. Conceptually, it is helpful to think of the reduced free stream velocity as that which is recovered by receiver 42 and that which comprises the pneumatic output signal, $P_{out}$. The reduction in magnitude of the reduced free stream velocity with respect to the magnitude of the free stream velocity bears a known relationship to the electric input signal which is acting to position deflector 38 with respect to gas stream 36. Accordingly, the interrelationship of the electric input signal, the pneumatic output signal and the aerodynamic deflection of gas stream 36 by deflector 38 can be shown by the vector analysis of aerodynamic interaction. It should be understood that the recovery of the portion gas stream by receiver 42 is affected by factors in addition to the aerodynamic analysis above and such analysis yields only an approximation of the actual result.

Figure 5:
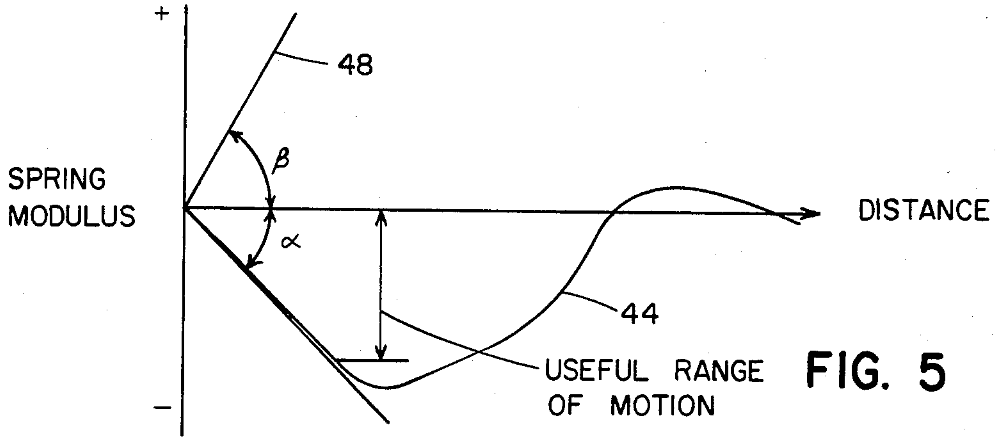
FIG. 5 is a graph illustrating the force required to incrementally move the deflector through a range of motion of the deflector.

For the purposes of this disclosure, spring modulus is defined as the additional force necessary to deflect a device an additional unit of distance. Referring to the graph of FIG. 5 the horizontal axis of the graph represents distance. Zero distance is when the deflector is positioned so as to not affect the gas stream. Increasing distance to the right on the graph represents movement of the deflector into the gas stream. The vertical axis represents spring modulus with positive force upward from the zero force and negative force downward from the zero force. Curve 44 represents spring modulus of the deflector and shows the force required to move the deflector plotted against distance. For purposes of the instant invention only the first portion of curve 44, from its origin (zero) to near its lowest point is useful since this portion has a substantially linear relationship between spring modulus and distance. The spring modulus of the actuator is shown by line 48. Since the actuator opposes the lift force generated by the deflector, the spring modulus of the actuator is opposite in sign to the deflector spring modulus. Such actuator spring modulus is a function of the construction of the actuator and the slope of line 48 may be made to vary depending on such construction. It has been found that to assist in providing stable operation of the deflector, it is desired that the construction of the actuator have a spring modulus that is greater than the spring modulus of the deflector. Accordingly, for enhanced stable operation, the angle $\beta$ must be greater than the angle $\alpha$. Where the angle $\alpha$ is equal to or greater than the angle $\beta$, it has been found that the deflector oscillates as it affects the gas stream, resulting in erroneous pneumatic output signals.

Figure 6:
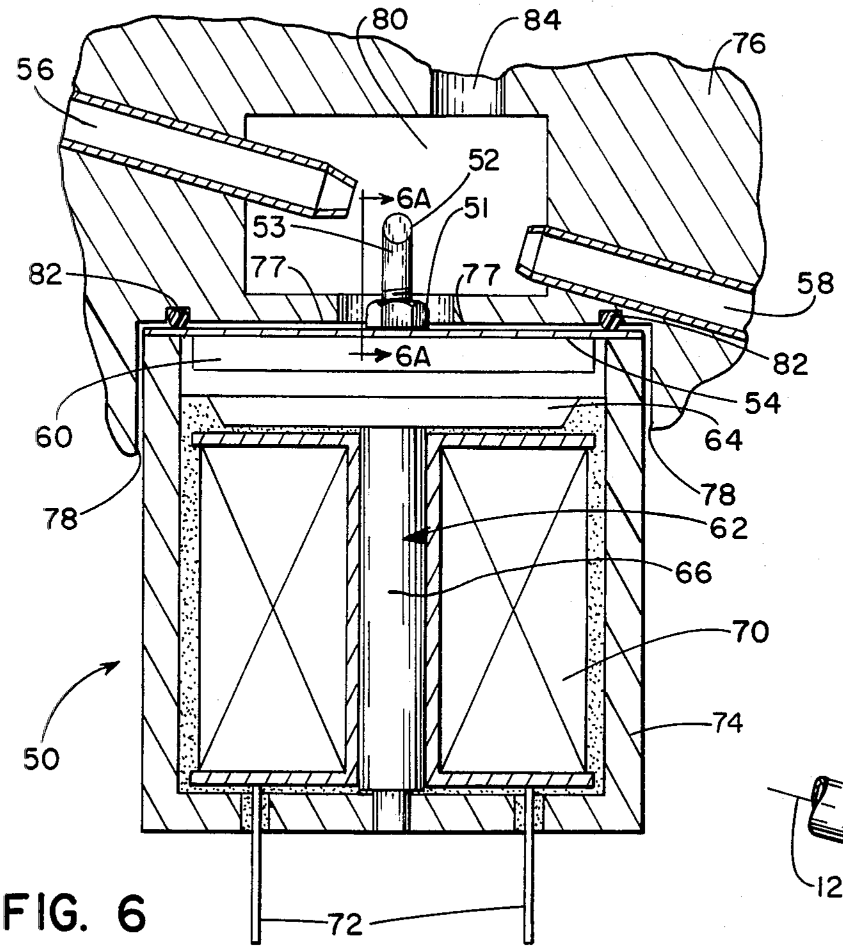
FIG. 6 is a cross section of a preferred embodiment of an electric signal to pneumatic signal transducer made according to the present invention.
Figure 6A:
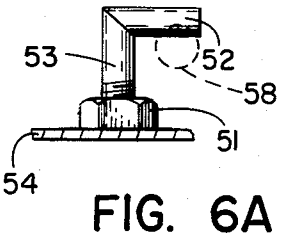
FIG. 6A is a left side view of the L shaped deflector shown in FIG. 6 taken on line 6A—6A in FIG. 6.
Figure 6B:
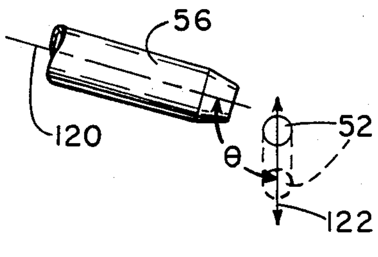
FIG. 6B is an illustrative view showing the angular relationship between the longitudinal axis of the nozzle shown in FIG. 6 and a line formed by the path of motion of the deflector.

The preferred embodiment of the electric signal to pneumatic signal transducer 50 shown in FIG. 6 shows the invention coupled to a magnetic type actuator. It is understood that other types of actuation may be utilized such as magnetostriction, shape-memory alloy, electret and piezoelectric. Preferably, deflector 52 is an L shaped rod with a circular cross section of both legs of the L. This L shaped construction can be more readily seen in FIG. 6A. The numbers in FIG. 6A correspond to those in FIG. 6. The opening of receiver 58 is shown as a circle of dashed lines to illustrate the relationship of deflector 52 and receiver 58. As can be seen, pedestal 53 is mounted on diaphragm 54 laterally offset from receiver 58. The end of the first leg of the L shaped deflector 52 is mounted at the center of a first side of diaphragm 54 by threading into nut 51 affixed to diaphragm 54. Other means of affixing deflector 52 to diaphragm 54 are known to be satisfactory, including bonding or brazing. Such first leg comprises deflector pedestal 53. Other embodiments of deflector pedestal 53 are satisfactory. For example, deflector pedestal 53 may be a truncated cone with its large end affixed to diaphragm 54 and deflector 52 disposed on the small end substantially as shown at 126 in FIG. 3A. In the embodiment shown, the second leg of the L shaped rod is so located that motion parallel with the longitudinal axis of deflector pedestal 53 causes deflector 52 to affect the gas stream from nozzle 56. Such motion affects the portion of the gas stream recovered by receiver 58 as previously described. In the embodiment, the motion of deflector 52 describes a line that makes an angle with the longitudinal axis of nozzle 56 that is between 75 degrees and 150 degrees. Such relationship is shown more clearly in FIG. 6B. Nozzle 56 is shown in relation to deflector 52 in both of the limits of operation of deflector 52. Line 122 is the line described by the motion of deflector 52 as it moves from one operational limit to the other. The longitudinal axis of nozzle 56 is shown by broken line 120. The angle $\theta$ is the angle between longitudinal axis 120 and line of motion 122. Such angle may be between about 75 degrees and 150 degrees. In a preferred embodiment of transducer 50, motion of deflector 52 along such angle enhances the stability of operation of deflector 52 as deflector 52 interacts with the gas stream. Pedestal 53 is better able to accept variations in the gas stream and still provide stable operation when it is oriented at such angle. This aids in minimizing the effect of such variations on deflector 52.

Disc 60 in FIG. 6 is mounted to a second side of diaphragm 54. In a preferred embodiment, disc 60 has properties such that it is affected by a magnetic force. Spaced apart from disc 60, is pole piece 62. Pole piece 62 is comprised of two parts, circular disc portion 64 and rod 66. Circular disc portion 64 is substantially parallel with and spaced apart from disc 60. An end of rod 66 is mounted in the center of circular disc portion 64. Rod 66 projects into the center opening of ring-shaped coil 70. Coil 70 is connected by leads 72 to the electrical input signal. Coil 70 is contained in cup-shaped housing 74 with diaphragm 54 forming the cover on the cup. The periphery of diaphragm 54 is affixed to the lip of cup-shaped housing 74.

Nozzle 26 and receiver 58 are mounted in cap 76 as described in FIG. 1. Cap 76 has an interior chamber 80 in which the ends of nozzle 26 and receiver 58 are mounted. A circular recess 78 is provided in cap 76 into which housing 74 is inserted. There is an opening between recess 78 and chamber 80 to permit pedestal 53 to be inserted into chamber 80 when housing 74 is placed in recess 78. When inserted, diaphragm 54 cooperates with cap 76 to close the opening from chamber 80 to recess 78. Chamber 80 is sealed at the juncture of diaphragm 54 and cap 76 by O-ring 82. It is understood that other suitable sealing means may be utilized. The portion of the gas stream flow not recovered by receiver 58 is exhausted from chamber 80 through exhaust port 84.

The device shown in FIG. 6 comprises a module of approximately 2.0 cm in diameter. In a preferred embodiment, this module may be removed from its supporting hardware and replaced in the field as desired.

In operation, the D.C. current electric input signal is applied to leads 72 and flows through coil 70. In response thereto, a magnetic flux flows in pole piece 62 to generate a magnetic force. Such force exerts an influence on disc 60 having a known relationship to the magnitude of the electric input signal. Effectively, the greater the magnitude of the electric input signal, the greater the magnetic attraction between pole piece 62 and disc 60. This attraction results in deflection downward toward pole piece 62 of diaphragm 54 and deflector 52 attached thereto. Diaphragm 54 is elastic, being stretched metal, and thus has a spring bias that tends to return it from any deflected position to the rest position shown in FIG. 6. In addition to the spring bias of diaphragm 54, the magnetic attraction also opposes the lift generated by the gas stream flow across deflector 52 as shown in FIG. 3. The magnetic force acts to attract deflector 52 and thus position deflector 52 further from the gas stream, thereby reducing the effect of deflector 52 on the gas stream issuing from nozzle 56. The maximum electric input signal causes the greatest magnetic force, resulting in the greatest downward deflection of diaphragm 54 and positioning of deflector 52 at the operational limit where the gas stream is unaffected by deflector 52. Such position comprises the maximum distance from the gas stream. This limit of operation is shown in FIG. 1. Conversely, the minimum electric input signal causes the least magnetic force on disc 60, resulting in no deflection of diaphragm 54. As shown in FIG. 2, this results in the maximum deflection of the gas stream. If diaphragm 54 is at a deflected position when the minimum electric signal is applied, the lift generated by deflector 52 and the spring bias of diaphragm 54 tends to cause deflector 52 to rise, positioning deflector 52 more proximate to the gas stream and increasing the deflection effect of deflector 52 on the gas stream. Upward motion of diaphragm 54 is stopped by lip 77 formed in cap 76. This position, comprising the rest limit of operation of diaphragm 54 and deflector 52, shown in FIG. 2, results from a minimum electric input signal, which in turn provides minimum pneumatic output signal from receiver 58 (or 16). Accordingly, it can be seen that in the preferred embodiment shown the maximum electric input signal results in the maximum pressure output signal and the minimum electric input signal results in the minimum pressure output signal.

An advantage of the previously detailed embodiment is that it is inherently fail-safe. A power failure results in a zero electric input signal. Such signal results in zero magnetic attraction, permitting diaphragm 54 and deflector 52 to rise to the rest position shown in FIG. 6 as a function of the lift generated on deflector 52 and the spring bias of diaphragm 54. As previously described, in the rest limit position, deflector 52 is fully affecting the gas stream from nozzle 56 which results in substantially zero pneumatic output signal. Accordingly, in the event of a power failure, transducer 50 fails safe by automatically producing a zero pneumatic output signal.

In FIG. 7, the invention is shown utilized in a preferred embodiment of a control loop 88. A detailed description of the control function is contained in Copending application Ser. No. 06/352,312, entitled Control Circuit for Current to Pressure Converter, which was filed Feb. 12, 1982 and is assigned to the same assignee as this application. Generally, an electric input signal, $I_{in}$ is provided to electric signal to pneumatic signal transducer 90. Such signal may be either a voltage or a current signal, although it is described as a current signal.

In operation, controller 96 monitors a desired parameter such as flow in pipe 98 by an electric signal from flow sensor 100. The flow required by controller 96 may be a function of a computed input or may be a human input. When the electric signal from flow sensor 100 is at variance with the flow required by controller 96, controller 96 will output an electric command signal, Ic to comparator 102. Comparator 102 compares Ic to the electric feedback signal $I_F$ and sends an appropriate electric input signal, $I_{in}$ to transducer 90. Additionally, a supply of gas, $P_s$, is provided to transducer 90. In a preferred embodiment, transducer 90 comprises transducer 50 shown in FIG. 6. It is understood that actuation means other than the magnetic means shown in FIG. 6 may be used as previously indicated.

The pneumatic output signal, $P_{out}$, in FIG. 7 is a pressure signal and is the pressure of the portion of the gas stream recovered by the receiver in transducer 90 responsive to the electric input signal as previously explained. Such pressure is typically substantially 0–4 pounds per square inch (psi). In the preferred embodiment shown, the pneumatic output signal is inputted to pneumatic second stage 92 where it is amplified. Pneumatic second stage 92 comprises a pneumatic amplifier. Typically, $P_{out}$ controls a valve that functions to pass a portion of a high pressure pneumatic supply, $P_{s(high)}$, to an output port. Such portion of $P_{s(high)}$ comprises an amplified pneumatic output signal, $P_{out(amplified)}$. Such amplified pneumatic output signal is typically 3–15 psi. The amplified pneumatic output signal from pneumatic second stage 92 is at an elevated pressure relative to the pneumatic output signal from electro-pneumatic transducer 90 and bears a known relationship thereto. This amplified pneumatic output signal, $P_{out\ (amplified)}$, is provided by pneumatic tubing or the like to control actuator 94 to effect control of valve 104 in order to alter flow in pipe 98 as commanded by controller 96.

The amplified pneumatic output signal may also be provided to feedback device 106 by pneumatic tubing or the like.

Feedback device 106 senses such amplified pneumatic output signal or, alternatively, senses the position of valve 104 as shown by the dotted line 95 between feedback device 106 and control actuator 94. In a preferred embodiment, feedback device 106 is a piezoresistive bridge type pressure sensor or strain gage and, alternatively when a position sensor is used, the sensor is a LVDT, potentiometer strain gage, synchro or other position encoding device, which is connected to comparator 102 and provides a feedback signal $I_F$. As the amplified pneumatic output signal varies or the position of valve 104 varies, the resistances of the piezoresistive bridge or the position sensor signal vary which causes $I_F$ to vary. Comparator 102 controls the $I_{in}$ to transducer 90, and thereby the pneumatic output signal as a function of a comparison of $I_F$ and $I_C$.

The pneumatic output signal therefore is controlled as a function of the $I_C$ from controller 96 and the pressure or position sensed by feedback device 106. In one preferred embodiment, controller 96 provides an input DC current $I_C$, which varies between four and twenty milliamperes. An increase in DC current $I_C$ from controller 96 as a result of a change in the parameter being sensed by flow sensor 100 results in departure from electrical balance between the $I_F$ and $I_C$ signals, which in turn results in an increase in the $I_{in}$ applied to transducer 90 and an increase in the $P_{out}$ being supplied to pneumatic second stage 92. The $P_{out(amplified)}$, therefore, increases and feedback device 106 changes its resistance. $I_F$ changes (and the $I_{in}$ applied to transducer 90 continues to change) until a new balance between the $I_F$ and $I_C$ signals is attained. At the new balance the $I_{in}$ applied to transducer 90 remans constant. The pneumatic signal $P_{out}$, remains constant at the level which it had when balance was attained. When a deviation from balance occurs (due to a change in either the $I_F$ or $I_C$ signals) the $I_{in}$ again changes until balance is again attained.

What is claimed is:

1. An electric signal to pneumatic signal transducer having an electric input signal and a gas supply comprising:

nozzle means connected to the gas supply for expelling a gas stream, receiver means spaced from the nozzle means positioned for recovering at least a portion of the expelled gas stream, the recovered portion constituting a pneumatic output signal; and deflector means, the position of which relative to the gas stream is controlled by the electric input signal for aerodynamically deflecting the gas stream expelled from the nozzle means to thereby affect the magnitude of the potion of the gas stream recovered by the receiver means and for providing an aerodynamic force to urge the deflector means further into the gas stream.

2. An electric signal to pneumatic signal transducer as claimed in claim 1 wherein a portion of the deflector means aerodynamically affects the gas stream, which portion comprises at least an arc of a circle in cross section.

3. An electrical signal to pneumatic signal transducer as claimed in claim 2 wherein the deflector means is made to respond to the electric input signal by means of magnetic actuation.

4. An electric signal to pneumatic signal transducer coupled to an input pneumatic supply of gas under pressure and having a pneumatic output port and electrically connected to a source of electric input signals, the transducer comprising, nozzle means having a first end coupled to the input pneumatic supply of gas and a second end coupled to the first end and having an opening for expelling the gas in a stream at a velocity;

receiver means spaced apart from the nozzle means and having a first end having an opening for recovering a portion of expelled gas stream directed from the second end of the nozzle means and a second end coupled to the first end and coupled to the pneumatic output port for supplying the portion of the received gas stream thereto;

actuator means connected to the source of electric input signals for converting such signals to motion in a plane;

deflector means coupled to the actuator means such that the deflector means are moved responsive to the input electrical signals, said deflector means being located with respect to the gas stream whereby the deflector means is urged into the gas stream by aerodynamic lift, and located with respect to the nozzle means and receiver means whereby motion commanded by the actuator means causes the deflector means to move to affect the expelled gas stream between the nozzle means and receiver means, the deflector means producing a resultant gas local velocity direction that is deflected from the direction of the expelled gas stream velocity, which deflection affects the portion of the expelled gas stream recovered by the receiver means, the portion recovered bearing a predetermined relationship to the electric input signal to the actuator means.

5. A transducer as claimed in claim 4 wherein the deflector means has a circular cross section.

6. A transducer as claimed in claim 4 wherein the deflector means has a triangular cross section.

7. A transducer as claimed in claim 4 wherein the deflector means has a semicircular cross section.

8. A transducer as claimed in claim 5 wherein the opening in the second end of the nozzle means is circular, the diameter of the deflector means being between one and two times the diameter of the opening in the second end of the nozzle means.

9. A transducer as claimed in claim 8 wherein the distance between the nozzle means and the receiving means is eight to twelve times the diameter of the opening in the second end of the nozzle means.

10. A transducer as claimed in claim 4 wherein the deflector means is positioned in the gas stream to produce a negative force per distance of deflection required of the actuation means to the deflector means to increasing affect the expelled gas stream, and the actuator means having a spring modulus greater in magnitude and opposite in sign to the spring modulus of the deflector means.

11. A transducer as claimed in claim 4 wherein the nozzle means has a longitudinal axis and the deflector means moves along a line intersecting the longitudinal axis at an angle $\theta$ between 75 degrees and 150 degrees.

12. A transducer as claimed in claim 8 wherein the diameter of the opening in the second end of the nozzle means is between 0.025 and 0.05 centimeters.

13. A transducer as claimed in claim 8 wherein the diameter of the opening in the second end of the nozzle is 0.0375 centimeters.

14. A transducer as claimed in claim 4 wherein the input electric signal is variable between 0 and 2 millamperes.

15. An electrical signal to pneumatic signal transducer having an electric input signal and a gas supply having:

nozzle means connected to the gas supply for expelling a gas stream, receiver means spaced from the nozzle means positioned for recovering at least a portion of the expelled gas stream, the recovered portion constituting a pneumatic output signal;

deflector means, the position of which relative to the gas stream is controlled by the electric input signal for deflecting the gas stream expelled from the nozzle means to thereby affect the magnitude of the portion of the gas stream recovered by the receiver means; and wherein the deflector means is shaped as an airfoil and located with respect to the nozzle means to affect the position of deflector means by aerodynamic lift.

16. An electric signal to pneumatic signal transducer as claimed in claim 15 wherein the aerodynamic lift urges the deflector means further into the gas stream.

17. An electric signal to pneumatic signal transducer as claimed in claim 15 wherein the deflector means is drawn into the gas stream by aerodynamic lift.

18. An electric signal to pneumatic signal transducer as claimed in claim 15 wherein the deflector means interacts with only a portion of the gas stream.

19. An electric signal to pneumatic signal transducer as claimed in claim 15 wherein the electric input signal drives the deflector means away from the gas stream.

20. An electric signal to pneumatic signal transducer as claimed in claim 4 further comprising a 4 to 20 milliampere two-wire electric circuit wherein the 4 to 20 milliampere two-wire electric circuit energizes the actuation means.

21. An electric signal to pneumatic signal transducer as claimed in claim 20 wherein the actuator means is a magnetic force actuator.

* * * * *

UNITED STATES PATENT AND TRADEMARK OFFICE

CERTIFICATE OF CORRECTION

PATENT NO. : 4,534,376

DATED : August 13, 1985

INVENTOR(S) : Gregory C. Brown

It is certified that error appears in the above-identified patent and that said Letters Patent is hereby corrected as shown below:

The Assignee of the above-identified patent reads "Rosemount, Inc." but should read --Rosemount Inc.--

In claim 1, line 21, the word "potion" should read --portion--.

In claim 4, lines 44-45, the word "recovering" should read --receiving--.

In claim 10, lines 22-23, the word "increasing" should read --increasingly--.

Signed and Sealed this

*Fourteenth* Day of *January 1986*

[SEAL]

*Attest:*

DONALD J. QUIGG

*Attesting Officer*

*Commissioner of Patents and Trademarks*